United States Patent [19]

Cutler

[11] Patent Number: 4,781,598

[45] Date of Patent: Nov. 1, 1988

[54] INSTRUCTIONAL APPARATUS

[76] Inventor: Burton Cutler, 19560 S. Rancho Way, Dominguez Hills, Calif. 90220

[21] Appl. No.: 66,316

[22] Filed: Jun. 25, 1987

[51] Int. Cl.$^4$ .............................................. G09B 3/00
[52] U.S. Cl. .................................................. 434/327
[58] Field of Search ............... 434/327, 346, 347, 348, 434/354, 331

[56] References Cited

U.S. PATENT DOCUMENTS 4,196,529  4/1980  Esbensen ............................ 434/327
4,657,248  4/1987  Benaim ................................ 434/327

Primary Examiner—Samuel Scott
Assistant Examiner—Noah Kamen
Attorney, Agent, or Firm—Roger A. Marrs

[57] ABSTRACT

An instructional device is disclosed herein having a booklet containing a series of sheets displaying questions, selectable answers and clues taking the form of pictorial, graphic and alpha/numeric characters. The selectable answers are displays of specific graphic forms and these graphic forms are repeated in seemingly random arrangement on an answer area of the sheet which includes an index mark. A separate decoder is provided having a case with open windows adapted to visually display underlying graphic forms from the answer area for visual comparison with selected graphic forms entered by the user into the decoder via movable members carrying graphic forms wherein the selected graphic forms on the movable members appear adjacent to windows with the correct answer association.

5 Claims, 1 Drawing Sheet

U.S. Patent    Nov. 1, 1988    4,781,598

INSTRUCTIONAL APPARATUS

BACKGROUND OF THE INVENTION

1. Field of the Invention

The present invention relates to improvements in instructional and self-testing devices and more particularly to a novel testing system having a booklet of sheets displaying questions, selectable answers and clues which are employed by the user in combination with a decoder for selecting answers to the questions and displaying the answers adjacent to correct answers carried in a display area on the sheet.

2. Brief Description of the Prior Art

Conventional instructional devices of a similar kind include cards or sheets that are punched with holes so as to permit a feeler or other implement to pass through aligned holes and complete pathways through some means located below the cards. Other prior devices include specially constructed implements having signal means incorporated therein which is actuated when a pair of opened electrical terminals are contacted.

Both of these systems require excessive alignment procedures for orienting a plurality of sheets so as to permit the feeler or other implement to be inserted through the plurality. In the other instances where electrical contacts are used, batteries, electrical power sources or the like are required and the systems are usually further complicated by including light, visual electrical displays or the like.

Therefore, a long standing need has existed to provide a novel instructional or self-teaching device which may be manually operated and indexed without reliance on electrical contacts or electrical circuits which will readily permit the user to select an answer to a question and employ graphic forms which may be associated with similar graphic forms when a proper answer has been selected by the user.

SUMMARY OF THE INVENTION

Accordingly, the above problems and difficulties are obviated by the present invention which provides a novel instructional or self-teaching device which includes a booklet having multiple sheets displaying questions, selectable answers and clues taking the form of pictorial, graphic and alpha/numeric characters. A decoder means is provided for operation by the user whereby selected answers to questions are introduced into the decoder by the user so as to display a selected graphic character representing the answer. The booklet sheet further includes a display area of answer graphic representations which are randomly disposed on the area and which include an index marker for registration with a similar marker on the decoder whereby open windows in the decoder display proper graphic characters for comparison with chosen or selected graphic characters by the user on the decoder. In this manner, a visual comparison between the two graphic characters indicates correctness of the selection by the user.

It is therefore a primary object of the present invention to provide a novel self-teaching system of simple and inexpensive construction which is employable for instructional and other purposes depending upon the contents of worksheets used in combination therewith.

Another object of the present invention is to provide a novel decoding device for use in combination with a sheet of questions and clues and which further includes a display of randomly placed graphic characters which are decoded to provide the proper and correct answer when compared with selected answers on the decoder by the user.

A further object of the present inveniton is to provide a novel self-teaching system incorporating a decoding device and a display device cooperating together so that associated characters may be readily compared by the user to determine correctness of the selected answer.

Yet another object of the present invention is to provide a novel instructional device of the character referred to which is not expensive to manufacture and use, which is highly effective in use and easy to understand and operate by children.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4 is an enlarged side-elevational view of the decoder shown in FIG. 2 as taken in the direction of arrows 4—4 thereof.

DESCRIPTION OF THE PREFERRED EMBODIMENT

Figure 1:
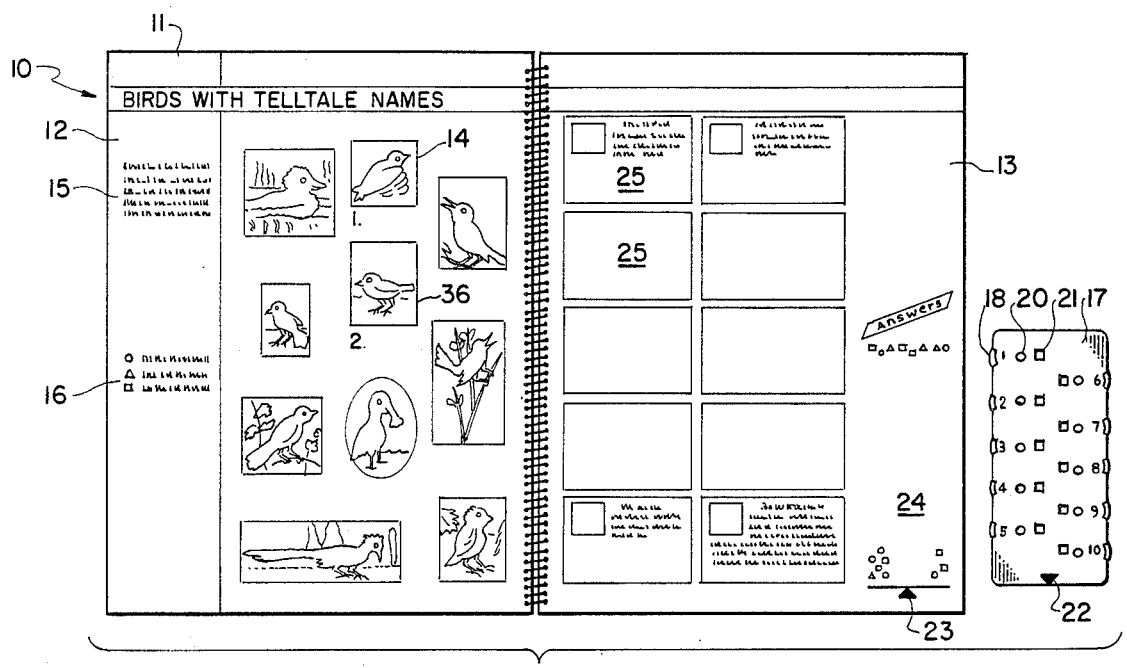
FIG. 1 is a front elevational view of the novel instructional apparatus of the present invention illustrating a booklet in an open position to show question and answer sheets, as well as a decoding device.

Referring to FIG. 1, the novel instruction device of the present invention is illustrated in the general direction of arrow 10 which includes a booklet 11 illustrated in an open position so as to expose pages 12 and 13. It is to be understood that a plurality of pages are employed and that pages 12 and 13 are representative of other pages which may contain similar subject matter. Referring in detail to FIG. 1, the page 12 includes a plurality of pictorial subject matter such as birds. The pictorial subject matter is arranged in ten picture areas and numeral 14 illustrates one such pictorial area. Also, the page displays instructions in an area identified by numeral 15. The area 15 can also be called a question area in which a plurality of questions can be listed. Another area identified by numeral 16 contains selectable answers in the form of graphic representations. In the present illustration, the graphic representations are a circle, a triangle and a square. The instructions or questions presented in area 15 are related by the user to the various pictorial subject matter shown'such as the bird in area 14. The solution or answer to the question is effected by the user by selecting one of the symbols shown in the area 16.

Next, the user employs a decoder 17 by encoding into the mechanism, a symbol which represents his selection from the group shown on area 16 of page 12. This is achieved by the user's moving a disc 18 which carries the symbols about its periphery so that a selected one of the symbols will appear in an opening 20 provided in the upper plat or housing of the decoder 17. It is to be noted that the opening 20 is adjacent to a window 21 provided in the plate or housing of the decoder 17. A plurality of movable members such as the discs 19 are provided along the edge of the decoder and a similar number of openings 20 as well as windows 21 are also employed. It is to be noted that the same arrangement of movable members, openings and windows are also associated with the opposite edge or side of the decoder 17. The openings 20 only expose the surface of the movable member such as the edge marginal regions of a wheel 18 while the windows 21 open all the way through the thickness of the decoder. It is also to be noted that the decoder 17 includes a marker 22 at the lower end which is placed in registry with a marker 23 carried on page 13 immediately adjacent to the answer area identified by numcral 24. This area carries a plurality of the symbols associated with area 16 on page 12; however, the plurality of symbols are arranged in a seemingly random relationship so that no particular order can be realized by the user which would indicate answers to the questions or instructions in the area 15 on page 12. However, when the decoder 17 is placed in proper alignment so that markers 22 and 23 are in registry, selected symbols will be observable through the windows 21 and these symbols will be adjacent to the symbols carried on the wheel or movable member 18 associated with each opening 20. In this way, the user can compare the two symbols that are being displayed and if the comparison proves identical, then the answer is proper and correct.

It is also to be noted that the answer page 13 not only includes the random arrangement of symbols in the area 24, but includes a plurality of blocks or spaces, such as space 25, which includes a clue as to what the answer can be. Therefore, several levels of clues are provided which are available to the user at his discretion. For example, the instructions contained in the area 15 serve as a clue for identifying the characters or graphics shown in the pictorial subject matter 14. If additional help is required, the user can then refer to the pictorial subject matter itself or can proceed to the answer page 13 and look for the clues shown in the respective boxes relating to the associated pictorial subject matter.

It is to be understood that other movable members can be employed, such as members which slide in a rectilinear manner with respect to the housing 17 of the decoder or a disc rotary member, such as the member 18, can be employed. The inventive concept includes sliding and rotating movable members carrying answer symbols that may be selectively placed for exposure through the opening 20.

Figures 2, 3, 5:
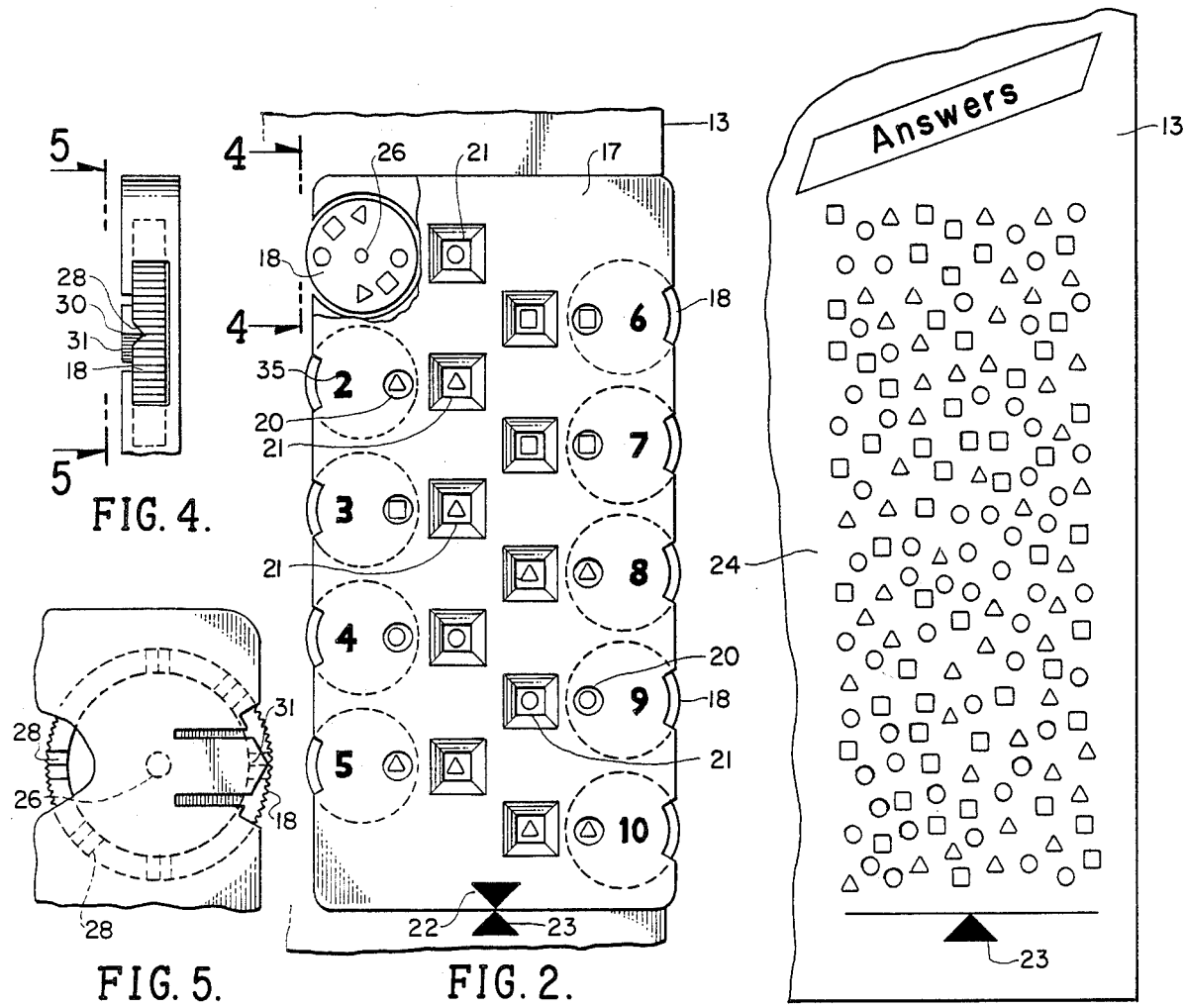
FIG. 2 is an enlarged front elevational view of the decoding device used in combination with the booklet shown in FIG. 1.
FIG. 3 is an enlarged fragmentary view showing the random placement of answer characters carried on the answer page of the booklet shown in FIG. 1.
FIG. 5 is a fragmentary view of the decoder as taken in the direction of arrows 5—5 of FIG. 4.

Referring now in detail to FIG. 2, the decoder is illustrated in which the wheel 18 is rotated about an axle r shaft 26 and it can be seen that the answer symbols, such as the circle, triangle and square, are carried on the edge marginal region of the disc or wheel. It is noted that a portion of the edge marginal region of the wheel 18 resides outside of the extreme edge of housing for the decoder so that the user's thumb may easily grasp the serrated or ridged edge of the wheel for rotational purposes. In FIG. 5, it can be seen that the opposite side of the wheel 18 from its side carrying the symbols is provided with a detent recess 28 into which a detent 30 engages. The detent 30 is outwardly projecting from the underside of a cantilevered projection 31. Therefore, as the wheel is rotated, the detent 30 will drop into a recess 28 which is associated with a particular answer symbol. In this fashion, once the user has selected a particular symbol and desires it to be displayed through the hole 20, the detent 30 will drop into the recess 28 and the wheel will be releasably held in the selected position FIG. 2 also illustrates that the top surface of the housing for the decoder 17 includes numeric indicia associated with particular questions listed on the sheet 12. As an example, the number 2, identified by numeral 35, is adjacent to a wheel intended to be turned to display a selected symbol through the opening 20, which is associated with the question number 2, indicated by numeral 36 on page 12. FIG. 2 further illustrates that the answer symbols visible through the windows 21 adjacent to the wheels 18 representing questions 1 through 5 are intended to be compared with the respective selected answer symbols or characters visible through the openings 20. A comparison between all the symbols indicates correct answers for all questions except for number 3 wherein the symbols are dissimilar and, therefore, an incorrect answer has been chosen.

Therefore, it can be seen that an instructional or self-teaching apparatus is illustrated wherein the first sheet in the booklet displays a plurality of pictorial and worded questions with the suggested multiple choice answers shown in symbol form in the area 16. The user can either answer the questions directly or use clues which are presented in the area spaces 25 on page 13. Once the user has selected an answer to the question, a symbol is chosen from the multiple choice answers on area 16 and the symbol is introduced to the decoder 17 by moving the appropriate wheel 18 adjacent to a window 20 associated with the number of the question being answered. Once the appropriate symbol has been displayed through the window 20, the detent 30 enters the recession or depression 28 on the wheel 18 and the wheel is releasably held in this position. After all the questions have been answered, the decoder 17 is placed over the area 24 so that the markers 22 and 23 are properly aligned. Such alignment registers correct symbols or characters in the plurality of windows 21. The user may now compare the correct symbols or characters visible through the windows 21 with the respective chosen or selected symbols appearing through the plurality of openings 20. A positive comparison between these symbols means that the question has been properly answered while a difference in symbol presentation indicates that a wrong answer has been selected by the user.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An instructional apparatus comprising the combination of:

a booklet containing a plurality of pages or sheets;

a first page of said pages displaying a set of pictorial images arranged in a predetermined order, a worded question area carrying corresponding question indicia and a set of symbols indicative of a variety of selectable answers associated with said images;

a second page of said pages having a clue area carrying indicia related to said set of pictorial images and an answer area carrying a plurality of said symbols wherein a first set of said symbols representing correct responses are located in a predetermined manner and the remaining of said plurality of symbols are randomly crowded aout said first set thereby obscuring said first set;

a decoding device having a plurality of open windows for displaying only said first set of said symbols carried on said answer area when said decoder is located in a predetermined location on said answer area; and said decoder further having movable means carrying said set of symbols for seleceted display via openings adjacent to each of said open windows whereby symbols on said movable means can be compared with symbols present at said windows.

2. The invention as defined in claim 1 including:

index means carried on said answer area and on said decoder for registering said decoder on said answer area at said predetermined location.

3. The invention as defined in claim 2 wherein:

said movable means comprises a manually movable member having an edge terminating beyond said decoder exterior for manual engagement by the user for selectably locating a desired symbol within said adjacent opening.

4. The invention as defined in claim 3 including:

detent means intercoupled between said decoder and said movable means for releasably holding said movable means in a selected position.

5. The invention as defined in claim 4 wherein:

said movable means is a rotary mounted wheel having a set of answer symbols carried on the edge marginal region thereof in alignment with said openings for selective display of a given symbol in said set.

* * * * *